United States Patent
Dhayni

(10) Patent No.: US 9,379,784 B2
(45) Date of Patent: Jun. 28, 2016

(54) NFC TAG EMULATION MODE WITH CONSTANT MAGNETIC FIELD

(71) Applicant: ST-Ericsson SA, Plan-les-Ouates (CH)

(72) Inventor: Achraf Dhayni, Vallauris (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/395,249

(22) PCT Filed: Apr. 23, 2013

(86) PCT No.: PCT/EP2013/058397
§ 371 (c)(1),
(2) Date: Oct. 17, 2014

(87) PCT Pub. No.: WO2013/167375
PCT Pub. Date: Nov. 14, 2013

(65) Prior Publication Data
US 2015/0079902 A1    Mar. 19, 2015

Related U.S. Application Data

(60) Provisional application No. 61/653,582, filed on May 31, 2012.

(30) Foreign Application Priority Data

May 7, 2012    (EP) .................................... 12305507

(51) Int. Cl.
| | | |
|---|---|---|
| *H04B 5/00* | (2006.01) | |
| *G06K 7/10* | (2006.01) | |
| *G06K 7/00* | (2006.01) | |

(52) U.S. Cl.
CPC ............ *H04B 5/0062* (2013.01); *G06K 7/0008* (2013.01); *G06K 7/10237* (2013.01); *H04B 5/0075* (2013.01)

(58) Field of Classification Search
CPC .. H04B 5/0025; H04B 5/0043; H04B 5/0056; H04B 5/0075; H04B 5/0081; H04W 4/008; G06K 7/10237
See application file for complete search history.

(56) References Cited

U.S. PATENT DOCUMENTS

| | | | |
|---|---|---|---|
| 7,049,936 B2* | 5/2006 | Wuidart | G06K 7/0008 340/10.32 |
| 2008/0088286 A1* | 4/2008 | Cho | G05F 1/56 323/280 |

(Continued)

FOREIGN PATENT DOCUMENTS

| | | |
|---|---|---|
| EP | 0 525 642 A2 | 2/1993 |
| GB | 2 430 331 A | 3/2007 |
| GB | 2465037 A | 5/2010 |

OTHER PUBLICATIONS

International Search Report issued in corresponding International application No. PCT/EP2013/058397, date of mailing Aug. 12, 2013.
Written Opinion of the International Searching Authority issued in corresponding International application No. PCT/EP2013/058397, date of mailing Aug. 12, 2013.

(Continued)

*Primary Examiner* — Andrew Wendell
(74) *Attorney, Agent, or Firm* — Patent Portfolio Builders PLLC

(57) ABSTRACT

A method for performing electromagnetic induction communication enables transmitting modulation data between communication devices. The method includes coupling a first antenna of a first communication device and a second antenna of a second communication device, generating a magnetic field by supplying a first current through the first antenna, and modulating the magnetic field according to the modulation data. The first current is regulated so as to be substantially constant, by introducing a regulating current, which is function of the magnetic field. The first communication device determines the modulation data from the regulating current.

12 Claims, 2 Drawing Sheets

(56) References Cited

U.S. PATENT DOCUMENTS

| | | | |
|---|---|---|---|
| 2009/0021219 A1* | 1/2009 | Yoda | H02J 7/0011 320/137 |
| 2009/0206791 A1* | 8/2009 | Jung | H02J 7/025 320/108 |
| 2013/0084801 A1* | 4/2013 | Royston | G06K 7/015 455/41.1 |

OTHER PUBLICATIONS

Extended European Search Report issued in corresponding European patent application No. EP 12 30 5507, date of completion of the search Nov. 30, 2012.

Klaus Finkenzeller; "RFID Handbook: Fundamentals and Applications in Contactless Smart Cards and Identification, Second Edition"; John Wiley & Sons 2003; ISBN: 0470844027; pp. 1-501; Sep. 2003.

* cited by examiner

NFC TAG EMULATION MODE WITH CONSTANT MAGNETIC FIELD

FIELD OF THE INVENTION

The present invention relates to the field of near-field communication devices and to circuitry for enabling the "powered by the field" mode (PBF).

BACKGROUND OF THE INVENTION

Near-field communication (NFC) is a short-ranger wireless communication technology for exchanging data between devices over distances of centimeters to tens of centimeters. One example application for NFC is radio-frequency identification (RFID) where a reader device can detect and retrieve data from a tag equipped with an antenna.

NFC devices communicate via magnetic field induction where the two loop antennas are located within each other's near field, effectively forming an air-core transformer.

There are generally two modes of NFC: a passive communication mode where the initiating device provides a carrier field and the target device answers by modulating the existing field; and an active communication mode where both the initiating and target devices communicate by alternately generating their own field.

The target device can be a smartcard or a tag, but also more advanced devices like a mobile phone that can "emulate" the behavior of such a tag. For this reason, the passive communication mode of the target device is usually called "tag emulation mode". This device can be called "tag emulator" or transponder.

To operate in active mode, both devices typically need to have a power supply, whereas in the passive communication mode two options are possible for the target device: the power may be supplied either by a power source (battery) or from the electromagnetic field provided by the initiating device.

The FIG. 1 illustrates a high-level functional architecture of a tag emulator device TED and of a reader device RD.

The reader device RD comprises a reader transmitter TX_AMP which radiates through the antenna AR a magnetic field. According to the most used standards specifications, the magnetic field is a sinusoidal wave at 13.56 MHz and amplitude between 0.5 and 7.5 Ampere/Meter.

This field is detected by the antenna AT of the tag emulator device TED.

This tag emulator device (or transponder) TED comprises analog functions AF1, AF2, AF3 . . . AFn of an analog area AA, which are connected to the antenna, and a digital area AD.

The first analog function AF1 is a load modulator which receives the analog field signal from the antenna A and modulation data TXMOD from the digital area DA. It modulates the field generated by the reader device RD by changing the load according to the modulation data TXMOD.

By changing the load across the tag emulator antenna AT, the output impedance of the reader antenna AR changes thanks to the electromagnetic coupling between the two antennas. This implies a change in the current flowing through the reader antenna AR and in this way, the modulation data TXMOD is transmitted by load modulation to the reader device RD.

A scaled copy Ic of this current is generated and injected to the analog-to-digital convertor READER_RX, where it is demodulated and processed so as to extract the data MD, which should be identical to the original modulation data TXMOD.

In the tag emulator device TED side, the digital area DA as well as the analog functions AF1, AF2, AF3 . . . AFn of the analog area AA are powered by a power supply S.

As previously said, in a battery mode, the power supply S can be powered by an external supply, for instance the battery of the handset in case the tag emulator device is a mobile terminal.

In a powered-by-the-field (PBF) mode, the power supplied is powered up by harvesting energy from the magnetic field received by the antenna AT.

In general, this harvesting is performed by a rectifier R of a Field Power Supply Unit FPSU, which rectifies the signal so as to provide the supply S with a DC output, called PFF SUPPLY. The power supply S can then generate supply signals S1, S2, S3 . . . Sn for the analog functions AF1, AF2, AF3 . . . AFn respectively and a supply signal Sd for the digital area DA.

More details about the functional architecture depicted in FIG. 1 could be found, for instance, in the book "RFID handbook—Fundamentals and Applications in Contactless Smart Card and Identification", second edition, Klaus Finkenzeller, Giesecke & Devrient GmBH, Munich, Germany, and especially in section 4.1.10.3 of this book.

However, as explained here-above, during the load modulation, the magnetic field is modulated so that it makes it difficult for the rectifier R to generate a constant DC output PBF_SUPPLY. High load modulation frequency components will appear on this output signal and as a consequence, in the supply signals S1, S2, S3 . . . Sn, Sd generated by the power supply S.

Inconstant supply signal may harm the analog functions AF1, AF2, AF3 . . . AFn as well as the digital area DA.

In some cases where the load modulation index is sufficiently low (usually at longer distance between reader RD and tag emulator devices TED), this issue can be solved by using high-order passive low-pass filter applied on the PBF_SUPPLY signal, but this solution is very costly in terms of silicon area and does not work in all situations, e.g. when the reader device and the tag emulator device are within a closer distance.

There is therefore a need for a solution improving the power supply in the powered-by-the-field (PBF) mode of a tag emulator device.

Also, the field modulation makes possible for spies to get the information transmitted between two NFC devices. A spy coil can be placed between the antennas of the reader and of the tag emulator devices. The coil can read the magnetic signal sent by the reader device RD and then reads the load-modulated signal created by the tag emulator device TED. In this way, it is possible for it to learn everything about the NFC protocol, standard, signal quality, signal level, signal timing, data sent and data received.

There is also a need to avoid such spy coils to get the transmitted information between the two devices.

SUMMARY OF THE INVENTION

An object of embodiments of the present invention is to alleviate at least partly the above mentioned drawbacks.

This is achieved with a method for performing electromagnetic induction communication consisting in transmitting modulation data to a first communication device from a second communication device. The method further comprises:
  Coupling a first antenna of a the first communication device and a second antenna of the second communication device, Generating a magnetic field by supplying a first current through the first antenna, Modulating this magnetic field according to the modulation data.

According to the invention, the first current is regulated so as to be substantially constant by introducing a regulating current which is function of the magnetic field.

The first communication device can then determine the modulation data from said regulating current (iR).

Embodiments of the invention offer many advantages, including the following:

- The coupling is achieved by providing the first antenna and the second antenna in the vicinity of one another.
- The magnetic field is modulated by modulating a second current flowing through the second antenna; this second current being dependent of the modulation data.
- The second current is modulated by modifying a resistance traversed by the second current according to the modulation data.
- The regulating current is determined by capturing the modulation of the first current.
- The first current is copied by a current mirror.
- The copy is used to control the value of the regulating current generated by a controlled current source.
- The regulating current is copied by a current mirror so as to provide a copied regulating current.
- This copied regulating current is supplied to a demodulator for generating a transmitted copy of the modulation data.

Another object of the invention is a reader device comprising a first antenna adapted to create an electromagnetic coupling with a second antenna of a tag emulator device, to generate a magnetic field according to a first current flowing through it and to detect a load modulation of the magnetic field, representative of modulation data provided by the tag emulator device by modulating the first current, a regulation element adapted to determine a regulating current as a function of the magnetic field, and an injection element adapted to inject this regulating current so as the first current is constant.

According to an embodiment of this reader device, the regulation element is adapted to determine the modulation data from the regulation current.

Another object of the invention is a system comprising a reader device as previously defined and a tag emulator device.

Still another object of the invention is a mobile terminal comprising such a reader device.

Further features and advantages of embodiments of the invention will appear from the following description of some embodiments of the invention, given as non-limiting examples, with reference to the accompanying drawings listed hereunder.

DETAILED DESCRIPTION OF EMBODIMENTS OF THE INVENTION

According to the invention, only the reader device RD can be modified. The Tag Emulator device TED can then be independent of the invention which can be used with any type of devices working according to the tag emulation mode.

Figure 1:
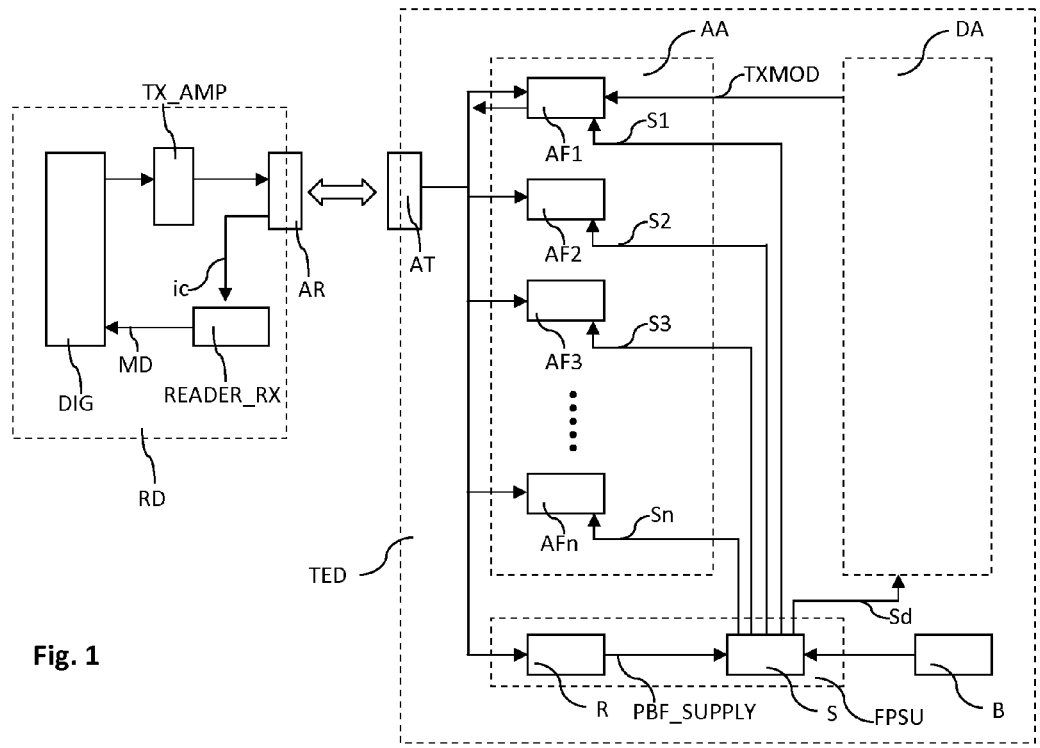
FIG. 1 shows a functional architecture of a reader device and of a tag emulator device, in the context of the invention.
Figure 2:
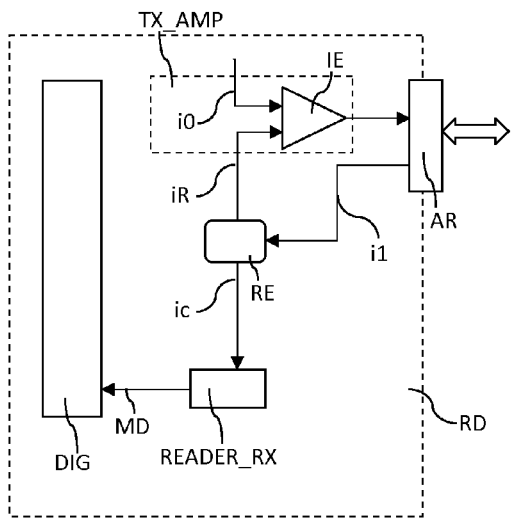
FIG. 2 shows a functional architecture of a reader device according to the invention.

For this reason, the FIG. 2, showing a high-level view of the principle of the invention, only depicts the reader device RD. The Tag Emulator device is supposed here-below to be the same as the one depicted in FIG. 1. It should however be understood that FIGS. 1 and 2 depict only functional views of the reader and tag emulator devices and that the invention should not be considered as limited to such functional architectures.

The reader device RD comprises a digital circuit DIG and analog elements TX_AMP, RE, IE, READER_RX and AR.

The reader transmitter TX_AMP, the reader antenna AR and the analog-to-digital convertor READER_RX have already been described in connection with FIG. 1.

When such a reader device RD is put in the vicinity of a tag emulator device, the reader antenna AR is dynamically coupled to the antenna of the tag emulator device. The electromagnetic coupling means that the currents i1 flowing through the reader antenna RA makes it generate a magnetic field and an induced voltage between extremities of the antenna of the tag emulator device.

What is meant by "vicinity" is dependent on the intensity of the current i1 and on the characteristics of the reader antenna AR. These data are however usually defined by standards to which the reader device complies. As said earlier, the coupling is usually established when the two antennas are within a centimeters to tens of centimeters proximity.

According to the invention, an injection element IE has been introduced so as to inject a regulating current iR. This regulating current iR is determined so that the current i1 flowing through the reader antenna AR becomes substantially constant. By "substantially", it can be understood that a $\pm 1\ \mu A$ ripple can be accepted after regulation.

The injection element IE supply a current i1 flowing through the reader antenna determined by i1=i0+iR, where i0 is the current supplied by the reader power source (not depicted in FIG. 2).

A regulating element RE determines this regulating current iR as a function of the magnetic field detected by the reader antenna AR.

As explained previously, the magnetic field generated by the reader antenna can be modulated by the tag emulator antenna according to modulation data. In a certain way, the magnetic field generated by the reader devices works as a carrier which could be modulated by a load corresponding to modulation data provided by the tag emulator device.

This load modulation can be detected by the reader device RD, since their antennas are magnetically coupled.

More concretely, any change (i.e. modulation) in the current traversing the tag emulation antenna is reflected by a proportional change (i.e. modulation) in the voltage of the reader antenna (and the other way around). As a consequence, any modulation of the magnetic field trends to naturally imply a corresponding modulation of the current i1 by induction.

According to an embodiment of the invention, this current modulation can be captured by the regulating element RE in order to supply the regulating current iR with a value compensating this modulation. In this way, the regulating element RE, the injection element IE and the reader antenna AR forms a current regulation loop.

According to an embodiment of the invention, the regulating element RE can capture the current i1 flowing through the reader antenna by way of a current mirror as it will be more detailed later in connection with FIG. 3.

Other embodiments are possible to enable the regulating element RE supplying a substantially constant current i1 by compensating the modulation of the magnetic field perceived by the reader antenna AR.

As a consequence of what has been explained, the compensation "decided" and enforced by the regulating element RE is function of this modulation. It other words, the regulating current iR is dependent and linked to the modulation data TXMOD. Therefore, according to another aspect of the invention, this "dependency" can be used by the reader device RD to determine the modulation data sent by the tag emulator device from the regulating current iR. The regulating current iR can be considered and used as representative of the modulation data TXMOD.

After an analog-to-digital conversion, it can provide a transmitted copy of the modulation data TXMOD.

In accordance with an embodiment of the invention, the regulating current iR can be copied (for instance by a current mirror) as a current iC supplied to digital circuits Dig of the reader device RD. Such an embodiment will now be explained by referring to FIG. 3.

Figure 3:
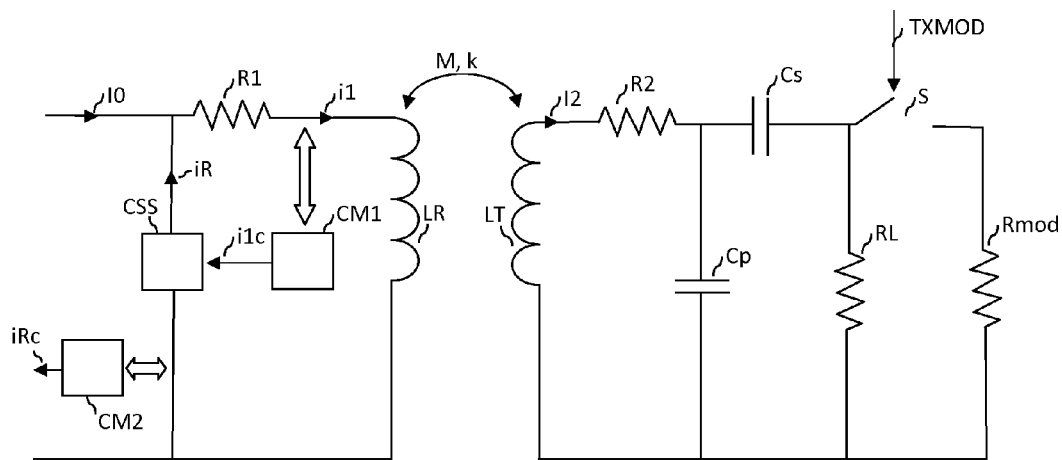
FIG. 3 shows circuits models of a reader device and of a tag emulator device, according to an embodiment of the invention.

The FIG. 3 shows a possible embodiment of the principle of the invention based on simplified circuits models. These circuit models are not representative of real circuits, but, for the clarity of the explanations, only depict elements which are closely related to the invention. The person skilled-in-the-art will be able to adapt these simplified circuit models to the real actual models he or she is working with.

The tag emulator device TED and the reader device RD are illustrated by two equivalent circuit models.

The coupled antennas (AT, ER on FIG. 1) are depicted as two coupled inductors, LT for the tag emulator device and LR for the reader device. They have a mutual inductance M and a coupling factor k, which is a function of the mutual inductance M.

On the tag emulator device side, the capacitors Cp and Cs are the components of the tag matching circuit. The circuit comprises also a resistance RL, which can be put in parallel with another resistance Rmod according to the position of the switch S. This switch S is controlled by modulation data TXMOD. More precisely, the modulation data is a sequence of binary value and for each value of the sequence the ideal resistance of the circuit is RL in case the binary modulation data is 0, and $$\frac{RL \times R \bmod}{RL + R \bmod}$$

when the binary modulation data is equal to 1.

On the reader device side, the current i1 flowing through the inductor LR is mirrored by a current mirror CM1. A scaled copy i1c of the current i1 is then used to control the value of the regulating current iR generated by a controlled current source CSS. The value of this regulating current iR is determined to regulate the current i0 provided by the source current of the reader device, so that the current i1 remains constant.

The scale can be determined as a compromise between a high value to get a good signal to noise ratio for the mirrored current i1c, and a low value in order to limit the current consumption. The scale value can then be determined as a function of the noise level in the circuit.

According to the modulation data TXMOD, the current i2 within the inductor LT will be modulated since the resistance of the model circuit traversed by this current i2 depends on the modulation data which acts on the switch S.

This modulation of the current i2 induces a modulation of the current i1 flowing through the coupled inductor LR.

This variation of the intensity of the current i1 causes immediately an opposite variation of the intensity of the regulating current iR in order to compensate for the change of i1.

In this way the current i1 is kept constant during load modulation, as well as the magnetic field generated by the inductor LR.

The load modulation associated with the modulation data TXMOD can be determined from the modulation of the intensity of the regulating current iR.

Therefore a second current mirror CM2 enables to copy and scale this regulating current iR so as to transmit a copied regulating current iRc to a demodulator. The demodulated signal can then be sent to the digital circuits of the reader device (not depicted), as a transmitted copy of the modulation data TXMOD.

As explained before, the scale can be a compromise and determined as a function of the noise level within the circuit.

Thanks to the regulation of the current i1 flowing through the inductor LR, the current i2 flowing through the inductor LT is also regulated since the magnetic field coupling the inductors LR, LT is constant. It makes it easier to use the energy associated with current as a power source to supply analog and digital circuits of the tag emulator device. As there is no more load modulations, the power source can be more stable, and the risks to harm the components of the device are dramatically reduces.

Said differently, in order to provide the digital and analog components of the tag emulator device, it is no more necessary to embed dedicated circuits regulating the power supply in the "powered-by-the-field" mode. These circuits are complex to deploy and are costly in term of silicon area. The invention thus allows reducing the complexity of the tag emulator device, as well as its silicon print, while providing a clean and regulated DC power supply.

An additional advantage of the invention relates is that it blocks the possibility to spy the communication between the devices by sniffing the load modulation. As there is no load modulation, a coil placed between the antennas of the reader device and of the tag emulator device will not be able to learn anything about the transmitted information.

Spying is therefore not possible anymore and the Near-Field Communication according to the principle of the invention is completely secured.

The invention claimed is:

1. A method for performing electromagnetic induction communication consisting in transmitting modulation data to a first communication device from a second communication device, said method comprising:
    coupling a first antenna of said first communication device and a second antenna of said second communication device;
    generating a magnetic field by supplying a first current through said first antenna; and
    modulating said magnetic field according to said modulation data,
    wherein said first current is regulated so as to be substantially constant, by introducing a regulating current which is a function of said magnetic field, and wherein said first communication device determines said modulation data from said regulating current.

2. The method according to claim 1, wherein said coupling is achieved by providing said first antenna and said second antenna in the vicinity of one another.

3. The method according to claim 1, wherein said magnetic field is modulated by modulating a second current flowing through said second antenna, said second current being dependent of said modulation data.

4. The method according to claim 3, wherein said second current is modulated by modifying a resistance traversed by said second current according to said modulation data.

5. The method according to claim 1, wherein said regulating current is determined by capturing the modulation of said first current.

6. The method according to claim 5, wherein said first current is copied by a current mirror.

7. The method according to claim 6, wherein a copy of the first current is used to control a value of the regulating current generated by a controlled current source.

8. A method for performing electromagnetic induction communication consisting in transmitting modulation data to a first communication device from a second communication device, said method comprising:
- coupling a first antenna of said first communication device and a second antenna of said second communication device;
- generating a magnetic field by supplying a first current through said first antenna; and
- modulating said magnetic field according to said modulation data, wherein said first current is regulated so as to be substantially constant, by introducing a regulating current which is a function of said magnetic field, and wherein said first communication device determines said modulation data from said regulating current, wherein said regulating current is copied by a current mirror so as to provide a copied regulating current.

9. The method according to claim 8, wherein said copied regulating current is supplied to a demodulator for generating a transmitted copy of said modulation data.

10. A reader device comprising:
- a first antenna configured to create an electromagnetic coupling with a second antenna of a tag emulator device, to generate a magnetic field according to a first current flowing through the first antenna, and to detect a load modulation of said magnetic field, representative of modulation data provided by said tag emulator device by modulating said first current;
- a regulation element configured to determine a regulating current as a function of said magnetic field; and
- an injection element configured to inject said regulating current so as said first current is constant, and to determine said modulation data from said regulation current.

11. A system comprising a reader device according to claim 10 and a tag emulator device.

12. A mobile terminal comprising a reader device according to claim 10.

* * * * *